Figure 1:
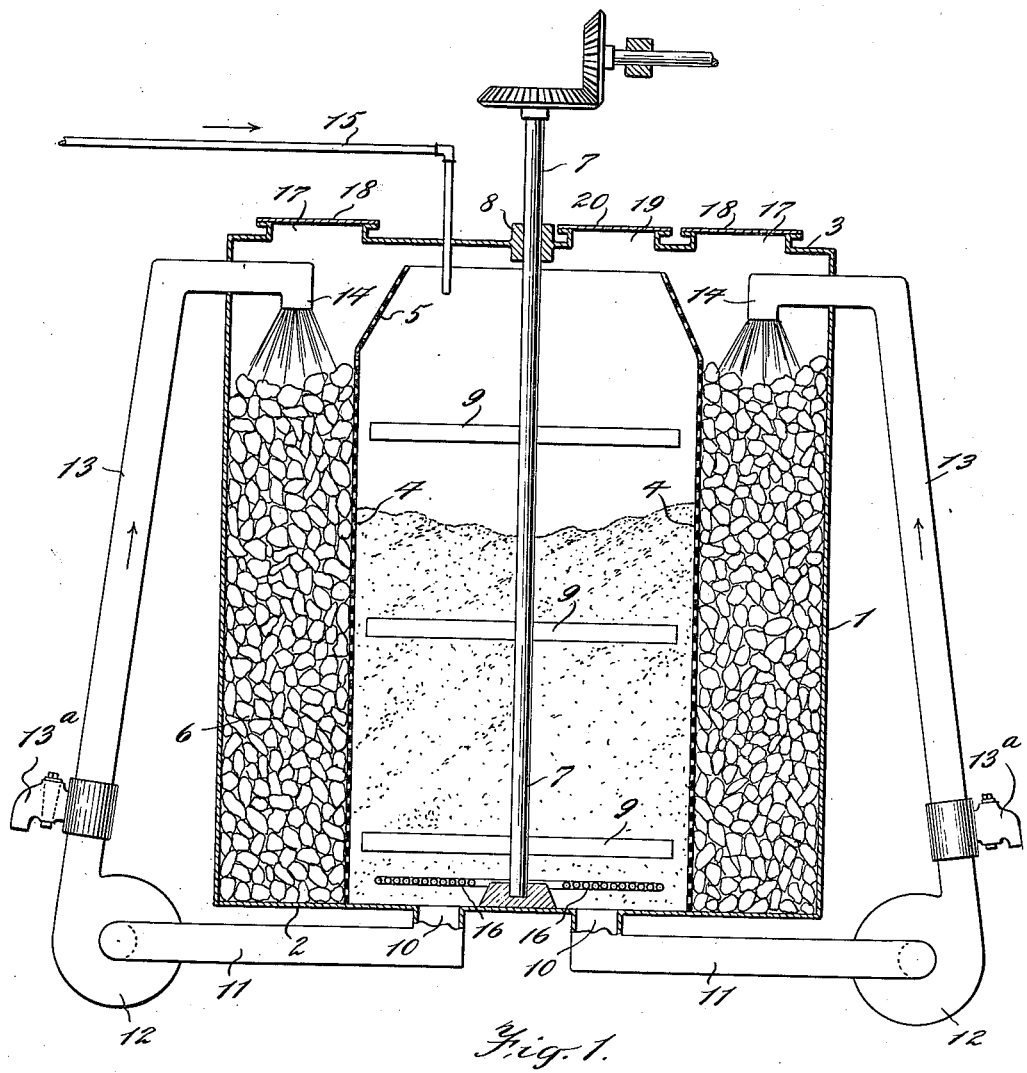

Dec. 2, 1924.

W. H. VOLCK 1,517,522

PROCESS FOR PRODUCING LIME SULPHUR COMPOUNDS

Filed June 13, 1922    2 Sheets-Sheet 2

William H. Volck
Inventor

By Gifford & Bull
his Attorneys

Patented Dec. 2, 1924.

1,517,522

UNITED STATES PATENT OFFICE.

WILLIAM H. VOLCK, OF WATSONVILLE, CALIFORNIA.

PROCESS FOR PRODUCING LIME-SULPHUR COMPOUNDS.

Application filed June 13, 1922. Serial No. 568,063.

*To all whom it may concern:*

Be it known that I, WILLIAM H. VOLCK, a citizen of the United States, residing at Watsonville, in the county of Santa Cruz and State of California, have invented certain new and useful Improvements in Processes for Producing Lime-Sulphur Compounds, of which the following is a specification.

My invention relates to new and useful improvements in materials used as insecticides and fungicides, and particularly contemplates an improved process for producing lime-sulphur compound or materials for the use stated.

A solution of lime-sulphur compound has been used to a considerable extent as an insecticide or fungicide, the most active insecticidal element of the compound being calcium pentasulphide ($CaS_5$), and has heretofore generally been produced by boiling together in water the correct proportions of quicklime (calcium oxide) and sulphur. The reactions of the old method involve the reaction of calcium oxide (CaO) with the formation of calcium sulphide (CaS), together with calcium sulphite ($CaSO_3$), and a lesser amount of calcium thiosulphate ($CaS_2O_3, 6H_2O$), the calcium sulphite ($CaSO_3$) being an insoluble compound and constituting the bulk of the "muck" or useless residue, which has little or no insecticidal or fungicidal value encountered in the old process. In practice, according to the old method, a ratio of approximately 1 part of quicklime to 2 parts of sulphur is commonly used. This difference is due to impurities in the lime and the occurrence of side reactions, which use greater ratios than are involved in the principal reaction, for example, there occurs a decomposition reaction according to the equation—$CaS_5 + 3H_2O = 3H_2S + CaSO_3 + S$, this reaction taking place more in a concentrated solution than in diluted solution, and mostly at the boiling point of the solution.

When free calcium oxide (CaO) is present, $H_2S$ may not be evolved because of the reaction—$CaO + H_2O + H_2S = 2H_2O + CaS$.

In practice of the old method, the reaction of decomposition is recognized by considering the batch complete when the evolution of hydrogen sulphide begins. In the absence of an excess of calcium a further reaction may take place as follows: $CaS_5 + H_2S = Ca(HS)_2 + 4S$, or calcium hydro-sulphide and free sulphur. It will thus be seen that the continued boiling of lime-sulphur solution after the reaction above mentioned is complete, results in a "muck" or residue containing calcium sulphite and free sulphur. It is clear that the formation of "muck" is objectionable, because it results in a considerable loss in the form of insoluble matter and the lime-sulphur solution held by it, and which can only be partly removed by filtration and washing. The quantity of "muck" resulting from the principal reaction is about 23 per cent of the total solid used, which percentage increases with higher concentrations of the solution. In fact, concentrations above 30° B. result in from 25 to 35 per cent of "muck," which means that by the old method the strength of the commercial solution is practically limited to 32° to 33° B. Under these circumstances, it is necessary, when it is desired to produce a more concentrated solution than that mentioned, for example, crystallized calcium pentasulphide ($CaS_5$), or the dry compound, to carry out the evaporation of a relatively dilute solution in vacuo, or by other special method, which is expensive and is attended with considerable decomposition of the lime-sulphur compound, so that dry lime-sulphur seldom contains more than approximately 65 per cent calcium pentasulphide ($CaS_5$), the remainder being decomposition products mentioned above which have little or no insecticidal or fungicidal value.

The primary objects of the present invention, among others which will appear from the following description, are to provide a process by which the formation of calcium sulphite, calcium thiosulphate, and other by-products, is prevented, and by which the water content of the product may be regulated to produce solutions of high concentration, and crystallized calcium pentasulphide ($CaS_5$), without resorting to any process of drying, and, further, to provide a process by which the lime-sulphur will contain a greater proportion of calcium pentasulphide than has hitherto been possible by any commercial process of which I am aware.

The invention consists, in its preferred embodiment, in reacting upon a mass of a mixture consisting of definite proportions of hydrated lime, $Ca(OH)_2$, and water in contact with sulphur and hydrogen sulphide.

The reaction occurs as follows:

$$Ca(OH)_2 + H_2S = CaS + 2H_2O.$$
$$CaS + 4S + N(H_2O) = CaS_5 + N(H_2O).$$

The reaction proceeds readily, it only being required to agitate or mix a mass containing hydrated lime $Ca(OH)_2$, water and sulphur in a closed vessel and subject the mass to hydrogen sulphide admitted to the vessel from any suitable source. The maximum temperature of the mass during carrying out of the reaction is preferably only that just required to maintain the calcium pentasulphide ($CaS_5$) formed, in a liquid or semi-liquid condition, and this temperature, when the proportion of water is sufficient to produce commercial lime-sulphur solution, may be approximately 20° C. to 25° C. If the proportion of water used is less than that necessary to produce commercial lime-sulphur solution, for example, if it is reduced to about 25 per cent of the total weight of the mass, it is desirable to maintain a temperature of from about 50° C. to about 65° C.

Hydrogen sulphide ($H_2S$) is then introduced into the mass until all of the caustic lime $Ca(OH)_2$ has been changed to $CaS$, according to the reaction—$Ca(OH)_2 + H_2S = CaS + 2H_2O$. In the treatment with hydrogen sulphide, the introduction of an excess thereof is to be avoided in order to obviate occurrence of the reaction—$CaS_5 + H_2S = Ca(HS)_2 + 4S$. During this treatment it is also desirable not to elevate the temperature materially above 75° C., as to do so may result in a decomposition reaction—

$$CaS_5 + 3H_2O = 3H_2S + CaSO_3 + S,$$

which is likely to take place if higher temperatures than 75° C. are employed.

In proceeding as just described, I may use the following proportions of ingredients:

| | Grams. |
|---|---|
| Water | 520 |
| Sulphur | 225 |
| Quicklime (CaO—97%) | 105 |

When employing these ingredients, they may be placed in any suitable vessel and warmed to approximately 40° C. and continuously agitated, during which agitation the hydrogen sulphide may be introduced by any suitable means until the hydrated lime is converted according to the reaction above given. In the specific example mentioned, it will be found that the total weight of the materials after the reaction will be approximately 922 grams, showing the addition of 72 grams of $H_2S$ or 68 grams of sulphur. Upon allowing for a very slight amount of sulphur contained in the slight insoluble residue obtained by filtering the solution, it will be found that the total quantity of sulphur, including that added by the hydrogen sulphide, is just that required to react with the calcium oxide of the quicklime added to produce the theoretical amount of calcium pentasulphide, $CaS_5$. In other words, practically all of the lime and sulphur combine to form substantially pure calcium pentasulphide, the side reactions mentioned being substantially eliminated.

It will be found that the solution produced by the above procedure will be approximately 38° B., or 1.350 specific gravity, and will contain approximately 39.7 per cent calcium pentasulphide, which is equivalent to substantially 63 per cent of the strength of the commercial dry lime and sulphur. This solution does not exhibit a tendency to crystallize.

The reaction above described proceeds without difficulty, but it may be hastened, if desired, by a more rapid introduction of the hydrogen sulphide, which is possible when a small amount of a suitable catalyzer or accelerator, for example, ammonia, is present in the mass. It will be found that an amount of ammonia (saturated solution) equal to ½ of 1 per cent of the total mass by weight will be sufficient to give a decided increase in the speed of the reaction.

I will now proceed to describe two forms of apparatus which are suitable for the practice of the invention above outlined. Referring particularly to Fig. 1 of the drawings, 1 designates an outer tank of suitable material, having a bottom 2, and a top wall or cover 3. The wall of this tank is imperforate in order to properly retain the mass, and prevent the escape of gases. Within the tank 1 is an inner concentric tank 4 formed of suitable material, and preferably perforated throughout, as clearly indicated in the drawings, the upper end of the tank or wall 4 being provided with a tapering or contracted neck portion 5. The wall of the tank 4 is suitably spaced from the wall of the tank 1 so as to form an annular chamber 6 which is adapted to contain the sulphur constituting one of the ingredients of the reaction. Within the tank 4 is arranged a vertical stirrer shaft 7 turning in suitable bearings 8, 8, and carrying radial arms or blades 9 which, when the shaft 7 is rotated by any suitable means, serves to keep the liquid mass agitated within the said chamber 4 and circulating through the mass of sulphur in the space 6. The bottom 2 of the tank within the chamber formed by the wall 4 is provided with one or more openings 10, each of which is connected by an outlet duct or pipe 11 with the inlet side of a liquid-forcing pump, of any suitable type, indicated diagrammatically at 12. From the outlet side of said pump 12 leads a pipe or conduit 13 which passes through the upper end of the tank 1 and terminates in an outlet spout 14 arranged to discharge into the space between the tanks 1 and 4. By this arrangement the circulating system withdraws the liquid mass from the center chamber and leads it to the top of the tank 1 and discharges it into the gas space in the upper end of the tank, where such liquid mass absorbs hydrogen sulphide and is deposited or flows through the solid sulphur to the liquid space in the inner tank 4. Hydrogen sulphide ($H_2S$) may be introduced into the gas space of the tank by means of a suitable supply pipe or conduit 15. The necessary heat for the reaction is supplied by means of steam coils 16 arranged preferably within the inner tank, and through which coils steam is circulated from any suitable source. When the process is to be performed with this apparatus, divided sulphur, preferably in lump form, is introduced through feed openings 16 in the wall 3 into the space between the tanks 1 and 4, and the said openings sealed by means of suitable covers 18. Hydrated lime, preferably in the form of milk of lime, i. e., $Ca(OH)_2$, suspended in water, and preferably of such consistency as to be readily flowable, is then introduced into the tank or chamber 4 through a port 19 in the cover 3, whereupon the said port is closed by a seal or cover 20, and the agitator and the circulatory system set in motion. Hydrogen sulphide is then introduced through the supply pipe 15 and the introduction is continued until the hydrated lime $Ca(OH)_2$ in the liquid mass in the tank 4 is largely converted into soluble sulphides. At this point more lime, preferably in the form of dry hydrated lime, is introduced through the port 19 by means of any suitable type of gas tight lock (not shown), the introduction of the hydrated lime being performed in this manner so as not to permit escape of gases from the system. The introduction of lime is continued until the liquid mass contains the desired concentration of calcium pentasulphide. The finished product is then withdrawn, preferably through a valve 13ª, in one of the conduits 13, to a storage tank, or may be run into containers desired to hold and ship the same. This type of apparatus may be used for the production of liquid lime-sulphur or crystallized calcium pentasulphide. The production of various grades of calcium pentasulphide in this apparatus is merely a matter of water percentage and temperature. The liquid solution flows out at ordinary temperature, but the crystallized compound requires to be heated to about 75° C. in order to be readily flowable.

Figure 2:
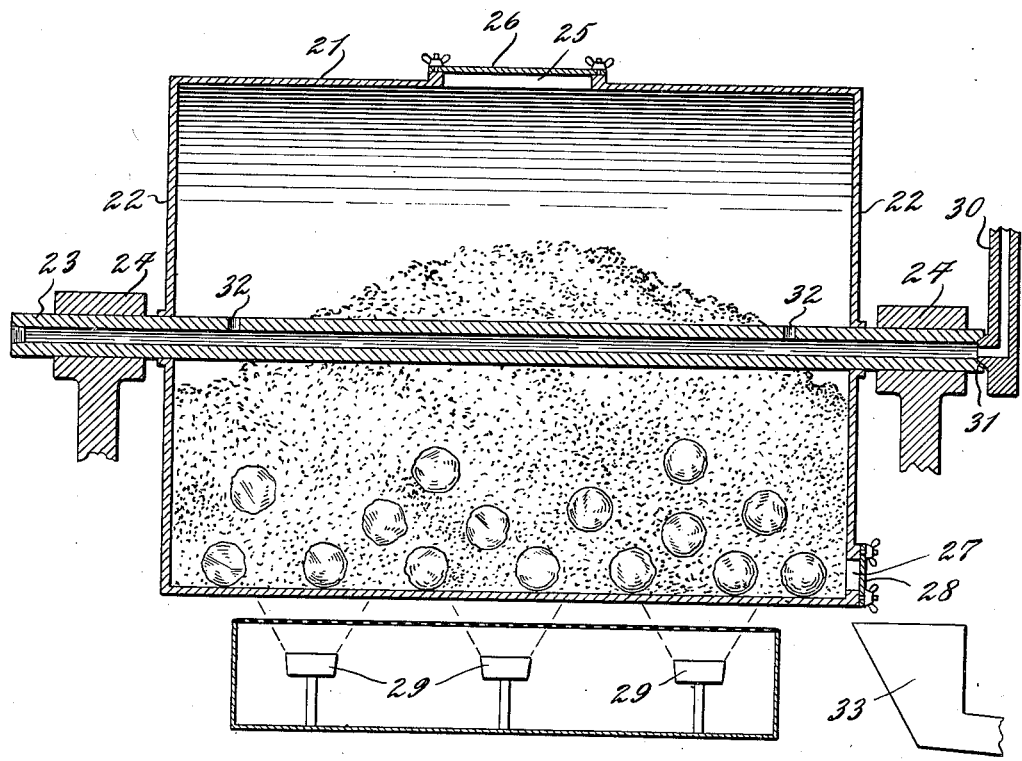

In Fig. 2 the apparatus is shown as comprising a horizontally arranged cylinder or drum 21 having closed heads 22, said cylinder being mounted upon a hollow shaft or axle 23 extending centrally through the drum, and to which the said heads are suitably secured. The shaft 23 is mounted in suitable bearings 24 and is adapted to be rotated in any suitable manner, not shown. The wall of the cylinder is provided with a filling port 25 adapted to be closed by a detachable cover 26, said cover being held in place by the well-known bolt and wing-nut arrangement commonly used in similar situations. One head of the cylinder is provided with a suitable drain port 27 adapted to be closed by a detachable cover 28 held in place by any suitable detachable holding means. The cylinder may be heated by any suitable heating means, preferably oil or gas burners 29 arranged beneath the cylinder. At one end a hollow coupling 30 is connected to the shaft 23 by a ground joint 31, and through which coupling hydrogen sulphide is supplied to the interior of the shaft and passes therefrom through openings 32 into the interior of the cylinder 22. When it is desired to employ this apparatus in the performance of the process, a mixture of sulphur (in either lump or powder form), quicklime and water in proper proportions, for example, those heretofore given, is introduced into the cylinder through the filling port 25, and also a suitable number of quartz, pebbles or stones, into the cylinder, whereupon the cylinder is closed by the head or cover 26. The cylinder is then slowly rotated, and during the rotation hydrogen sulphide gas is introduced into the cylinder through the coupling 30, hollow shaft 23 and ports 32, and heat is supplied by means of headers 29. During the rotation of the cylinder the quartz or pebbles mentioned serve to agitate the mass and afford proper mixture of the hydrogen sulphide therewith. When the reaction is complete, the rotation of the cylinder is stopped and the liquid mass is withdrawn through the drain port 28, from which it may flow into a receiving hopper or other receptacle 33, from which it may be flowed into containers designed for shipment, or into other containers, and permitted to solidify and then be broken up and placed in the containers. The apparatus shown in Fig. 2, as just described, will produce calcium pentasulphide of any desired concentration, but it is especially designed to make the material with a minimum water content which solidifies in cooling to a substantially dry product. In producing the crystallized product, the amount of water employed is approximately 30 per cent by weight of the total mass.

In carrying out this process, the hydrogen sulphide may be derived from any suitable source, for example, the hydrogen sulphide may be produced by heating sulphur with mineral oil in a retort and conducting the gas after washing in mineral oil directly into the apparatus.

No matter which of the apparatuses above described is employed, the reaction proceeds according to the principle heretofore described, producing either a solution or dry product of calcium pentasulphide in substantially pure form, that is, the product is substantially free from any of the decomposition products of side reactions, such as calcium sulphite and calcium thiosulphate. The time necessary to complete the reaction may be readily ascertained by test and examination of the product from time to time as the reaction proceeds, the reaction being completed when the tests show the product to consist in its substantial entirety of calcium pentasulphide ($CaS_5$).

What I claim and desire to secure by Letters Patent of the United States is:—

1. A process of producing lime-sulphur compound which consists in subjecting hydrated lime and sulphur to the action of hydrogen sulphide in the presence of water.

2. A process of producing lime-sulphur compound which consists in subjecting hydrated lime and sulphur to the action of gaseous hydrogen sulphide in the presence of water.

3. A process of producing lime-sulphur compound which consists in subjecting hydrated lime and sulphur to the action of hydrogen sulphide in the presence of water and an accelerator.

4. A process of producing lime-sulphur compound which consists in subjecting hydrated lime and sulphur to the action of hydrogen sulphide in the presence of water containing ammonia.

5. A process of producing lime-sulphur compound which consists in subjecting hydrated lime and sulphur to the action of hydrogen sulphide in the presence of water until the reaction—$Ca(OH)_2 + H_2S = CaS + 2H_2O$ is substantially complete.

6. A process of producing lime-sulphur compound which consists in subjecting hydrated lime and sulphur to the action of hydrogen sulphide in the presence of water while avoiding such excess of hydrogen sulphide as will result in the reaction—$CaS_5 + H_2S = Ca(HS)_2 + 4S$.

7. A process of producing lime-sulphur compound which consists in subjecting hydrated lime and sulphur to the action of hydrogen sulphide in the presence of water while avoiding such excess of hydrogen sulphide as will result in the reaction—$CaS_5 + H_2S = Ca(HS)_2 + 4S$, and at a temperature avoiding decomposition of the calcium pentasulphide ($CaS_5$) formed.

8. A process of producing lime-sulphur compound which consists in subjecting hydrated lime and sulphur in the presence of water to the action of hydrogen sulphide accompanied by agitation.

9. A process of producing lime-sulphur compound which consists in subjecting hydrated lime and sulphur in the presence of water to the action of hydrogen sulphide accompanied by applied heat.

10. A process of producing lime-sulphur compound which consists in subjecting hydrated lime and sulphur in the presence of water to the action of hydrogen sulphide accompanied by agitation and applied heat.

11. A process for producing lime-sulphur compound which consists in subjecting hydrated lime and sulphur to the action of hydrogen sulphide in the presence of water, and under temperature conditions sufficient to maintain the resulting calcium pentasulphide in liquid or semi-liquid condition.

12. A process for producing lime-sulphur compound which consists in subjecting hydrated lime and sulphur to the action of hydrogen sulphide in the presence of water and at a temperature not substantially above 75° C.

13. A process of producing lime-sulphur compound which consists in subjecting hydrated lime and sulphur to the action of hydrogen sulphide in the presence of water and an accelerator, and accompanied by heat and agitation.

14. A process of producing lime-sulphur compound which consists in subjecting calcium oxide, sulphur and water to the action of hydrogen sulphide, the water being present in such quantity as to act upon the calcium oxide to produce milk of lime.

In testimony whereof I have hereunto signed my name in the presence of two subscribing witnesses.

WILLIAM H. VOLCK.

Witnesses:
R. H. HUDSON,
J. E. GARDNER.